(12) United States Patent
Nahum

(10) Patent No.: US 6,335,618 B1
(45) Date of Patent: Jan. 1, 2002

(54) POSITION TRANSDUCER HAVING POSITION-DEPENDENT AMPLITUDE ENCODING APPLYING FIRST AND SECOND MODULATIONS

(75) Inventor: Michael Nahum, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/412,789

(22) Filed: Oct. 5, 1999

(51) Int. Cl.[7] .............. G01B 7/02; G01B 7/14; G01D 5/20; H03M 1/22
(52) U.S. Cl. .............. 324/207.17; 324/207.24; 340/870.32; 336/45; 341/15
(58) Field of Search ............... 324/207.12, 1, 324/207.29, 207.24; 340/870.36, 870.35, 870.31, 870.32, 870.33; 336/45, 130–135, 136; 318/653–655, 657; 341/15

(56) References Cited

U.S. PATENT DOCUMENTS

| 4,697,144 A | 9/1987 | Howbrook | 324/207.17 |
|---|---|---|---|
| 4,743,786 A | 5/1988 | Ichikawa et al. | 310/111 |
| 5,225,830 A | 7/1993 | Andermo et al. | 341/13 |
| 5,233,294 A | 8/1993 | Dreoni | 324/207.16 |
| 5,781,006 A | 7/1998 | Beichler | 324/207.19 |
| 5,841,274 A | 11/1998 | Masreliez et al. | 324/207.17 |
| 5,886,519 A | 3/1999 | Masreliez et al. | 324/207.17 |
| 5,894,678 A | 4/1999 | Masreliez et al. | 33/762 |
| 5,901,458 A | 5/1999 | Andermo et al. | 33/810 |
| 6,118,271 A | * 9/2000 | Ely et al. | 324/207.17 |

FOREIGN PATENT DOCUMENTS

| EP | 0905484 A2 | 3/1999 |
|---|---|---|
| GB | 2313199 A | 11/1997 |
| GB | 2321710 A | 8/1998 |

* cited by examiner

Primary Examiner—Jay Patidar
(74) Attorney, Agent, or Firm—Oliff & Berridge, PLC

(57) ABSTRACT

A high-accuracy inductive absolute position transducer system has two members movable relative to each other and includes an amplitude modulating transducer including flux modulators of progressively varying properties. The amplitude modulating transducer includes a transmitter winding and at least one set of receiver windings. An amplitude modulating transducer has a plurality of flux modulator zones distributed along the measuring axis. Flux modulators are formed in at least some of the flux modulator zones. The properties of different flux modulators are varied so as to generate varied flux. A signal generating and processing circuit is connected to the transmitter winding. The flux modulators modulate the inductive coupling based on the relative position between the read head member and the scale member.

35 Claims, 10 Drawing Sheets

POSITION TRANSDUCER HAVING POSITION-DEPENDENT AMPLITUDE ENCODING APPLYING FIRST AND SECOND MODULATIONS

BACKGROUND OF THE INVENTION

1. Field of the Invention

This invention relates to an absolute position electronic transducer. In particular, the invention relates to an absolute position transducer using one or more transducer elements that output a signal having a position dependent amplitude that varies at two different spatial frequencies.

2. Description of Related Art

Various movement or position transducing systems are currently available. These transducers are able to sense linear, rotary or angular movement.

An inductive absolute position transducer system is disclosed in U.S. Pat. No. 5,841,274 to Masreliez et al., incorporated herein by reference in its entirety. In this inductive absolute position transducer system, the system has two members movable relative to each other and includes a plurality of fine track transducers. Each fine track transducer is associated with a particular spatial wavelength.

Another inductive absolute position transducer system is disclosed in co-pending U.S. patent application Ser. No. 09/213,268, incorporated herein by reference in its entirety. The incorporated 268 application describes a reduced offset absolute position transducer that has at least one magnetic field generator that generates a first changing magnetic flux in a first flux region. A plurality of coupling loops have a first plurality of coupling loop portions spaced at a first wavelength along a measuring axis and a second plurality of coupling loop portions spaced at a second wavelength along a measuring axis. The 268 application further discloses that a third plurality of coupling loop portions is inductively coupled to a first changing magnetic flux from a transmitter winding in a first flux region to generate second and third changing magnetic fluxes outside the first flux region in the first plurality of coupling loop portions and the second plurality of coupling loop portions, respectively. The second and third changing magnetic fluxes inductively couples those coupling loop portions to first and second pluralities of receiver windings, respectively.

A capacitive incremental position transducer system is disclosed in U.S. Pat. No. 5,886,519 to Masreliez et al., incorporated herein by reference in its entirety. In this capacitive incremental position transducer system, the system has two members movable relative to each other and includes a fine track transducer. The fine track transducer is associated with a particular wavelength. The design of this capacitive incremental transducer could be replicated at a second, different, wavelength along a second track on the same transducer substrate, and the phase difference between the outputs of the two capacitive tracks could be used to establish an absolute position, in a manner analogous to the higher-level signal processing methods disclosed in the previously mentioned inductive transducer patents.

SUMMARY OF THE INVENTION

Increasing the absolute measurement range of inductive andcapacitive transducers is desirable for a variety of reasons. However, the absolute range is limited in known transducers. Specifically, with currently known inductive or capacitive transducers, it is difficult to increase the absolute measurement range while simultaneously maintaining a high resolution and small number of tracks (each track is associated with a particular spatial wavelength). Rather, to increase absolute measurement range using known techniques, it is necessary to increase the number of tracks in the position transducer and/or to reduce the resolution of the finest track. An increased number of tracks results in increased fabrication costs, as well as increased complexity and size of the transducer.

This problem occurs because the absolute range of a transducer is inversely proportional to the difference $\lambda_1 - \lambda_2$ between the spatial wavelengths $\lambda_1$ and $\lambda_2$ of the two tracks in a transducer. Additionally, the resolution is proportional to the finest wavelength, i.e., proportional to the smaller of $\lambda_1$ and $\lambda_2$. Consequently, to increase the absolute measurement range while keeping the resolution fixed, the difference between the wavelengths of the two tracks, i.e., $\lambda_1 - \lambda_2$, is reduced. However, due to inherent transducer errors, this difference will rapidly become impracticably small and difficult to reliably measure, thus resulting in a poor transducer accuracy. To further increase the absolute range while maintaining high accuracy and resolution, a third track, with a wavelength $\lambda_3$, must be used. The use of such a third track is described in the incorporated 274 patent. However, this third track adds additional cost, complexity and size, as described above.

Accordingly, this invention provides systems and methods for increasing the absolute measurement range that an absolute position transducer is capable of measuring.

This invention separately provides systems and methods that eliminate the need for a third track and, in some cases, the second track in an absolute position transducer.

This invention separately provides an absolute position transducer that has a substantially simplified design.

This invention separately provides an absolute position transducer that has lower manufacturing cost.

This invention separately provides an absolute position transducer that provides the ability to utilize a narrower scale.

This invention separately provides an absolute position transducer that allows for the reduction of the wavelength associated with each track, thus improving the resolution of the position transducer.

This invention separately provides an absolute position transducer that may be used with relatively simplified electronics. Illustratively, in some cases, the absolute position transducer may be used with three or fewer electronic channels.

This invention separately provides an absolute position transducer that is suitable for a wide variety of applications.

In accordance with the systems and methods of this invention, one exemplary embodiment of the absolute position transducer uses two members moveable relative to each other along a measuring axis of the position transducer. A first member contains at least one transmitter winding that each generates a changing magnetic field and at least two sets of receiver windings that sense proximate magnetic fields. The two or more sets of receiver windings have similar, but different, wavelengths. Thus, the spatial phase difference between the two wavelengths at a given position defines a coarse wavelength much longer than either of the individual wavelengths.

The second member has at least two sets of flux modulating elements, such as flux modulators or flux coupling loops, regularly positioned along the support member, at first and second predetermined intervals (wavelengths) corresponding to the wavelengths of the two sets of receiver windings. Each set of flux modulators or flux coupling loops is positionable within the magnetic flux generated by a corresponding one of the transmitter windings. The flux modulators can be either flux disrupters or flux enhancers. The flux modulating elements modulate the magnetic field inductive coupling proximate to the receiver windings, depending on the relative position between the first and second members.

As a result, a spatial dependence is introduced into the output of the position transducer. The spatial dependence is dependent upon the relative positioning of the first member and the second member. An electronic circuit coupled to the transmitter windings and the sets of receiver windings evaluates and compares the two outputs of the sets of receiver windings, evaluates the absolute position between the two members, and exhibits the position on a display.

The properties or characteristics of the flux modulating elements vary uniquely along the measuring axis over a range that is longer than any other wavelength of the transducer, including the coarse wavelength. In one exemplary embodiment, the variation is treated as a third wavelength that is at least as long as the extent of the flux modulating elements on the second member. As a result, the degree of flux modulation generated by the flux modulating elements of the second member will vary along the measuring axis of the absolute position transducer. An additional spatial dependence is thus introduced into the position transducer. This spatial dependence appears in the amplitude of the signals output by the pairs of receiver windings in each set of windings.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF THE PREFERRED EMBODIMENTS

Figure 1:
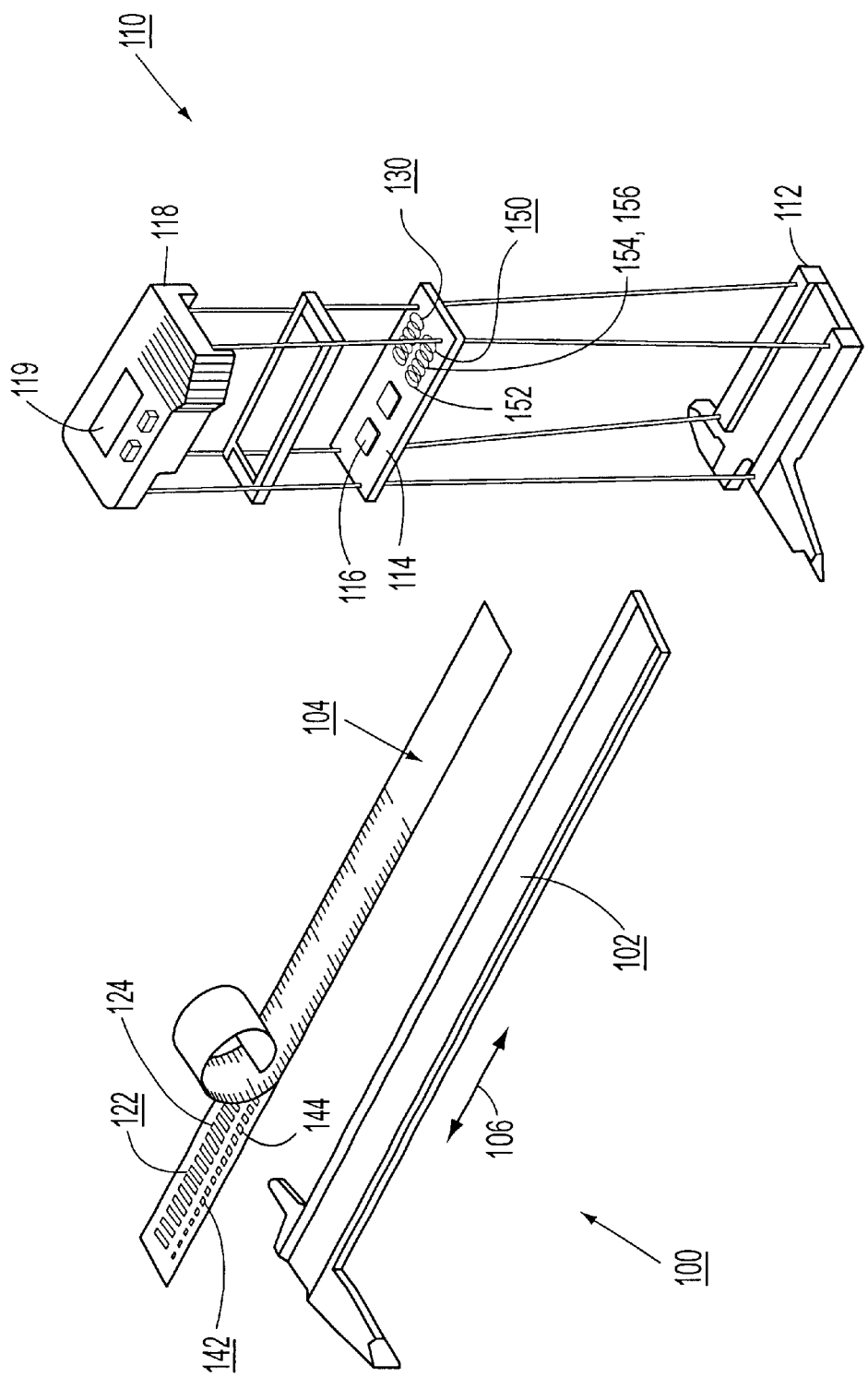
FIG. 1 is an exploded isometric view of one exemplary embodiment of an inductive absolute position transducer employing the basic sensing principle of this invention using flux modulators of varying properties.

For simplicity and clarification, the operating principles, design factors, and layout of the transducer windings of this invention are explained with reference to one exemplary embodiment of an inductive absolute transducer system according to this invention as shown in FIG. 1. The basic explanation of the operation of the inductive absolute position transducer system is applicable for the understanding and design of the constituent components employed in the absolute position transducers of this invention.

As shown in FIG. 1, an exemplary inductive absolute position caliper 100 includes an elongated beam 102. The elongated beam 102 is a rigid or semi-rigid bar having a generally rectangular cross section. An elongated measuring scale member 104 is attached to the elongated beam 102. The caliper 100 includes a slider assembly 110 positioned on the elongated beam 102 and movable along a measuring axis 106 of the elongated beam 102.

As shown in FIG. 1, the slider assembly 110 includes a base 112. The slider assembly 110 also includes a read head 114 mounted on the base 112 above the elongated beam 102. Thus, the base 112 and read head 114 move as a unit along the elongated beam 102. The measured distance is displayed on a conventional digital display 119, which is mounted in a cover 118 of the slider assembly 110. In the exemplary embodiment of the inductive absolute position transducer system according to this invention as shown in FIG. 1, the inductive absolute position transducer system includes two inductive incremental position transducers 120 and 140 that interact to provide an absolute position measurement over the length of the elongated beam. In particular, in each inductive incremental position transducer 120 and 140, a set of flux modulating elements 122 or 142, respectively, are provided on the scale member 104. Corresponding sets of transducer windings 130 and 150, respectively, are provided on the read head 114. The read head 114 also includes a signal generating and processing circuit 116. For each inductive incremental position transducer 120 and 140, the transducer windings 130 and 150, respectively, interact with the corresponding sets 122 and 142 of flux modulating elements, respectively, to generate a position-dependent signals, as described in detail in each of the incorporated 274 patent and the incorporated 268 application.

In the exemplary embodiment shown in FIG. 1, the sets 122 and 142 of flux modulating elements are sets of flux modulators as described in the incorporated 274 patent. The first and second sets 122 and 142 of flux modulators are spaced apart from each other across the scale member 104. Each set 122 and 142 of flux modulators includes a plurality of flux modulators 124 and 144, respectively. The flux modulators 124 extend along one side of the scale member 104 and the flux modulators 144 extend along the other side of the scale member 104 along the measuring axis 106. The flux modulators 124 and 144 may be flux disrupters, flux enhancers or a combination of both, as disclosed in the incorporated 274 patent. For example, the flux disrupters may be formed of copper and may be formed according to conventional printed circuit board manufacturing techniques, although many other methods of fabrication may be used.

Except as otherwise specified, measurements as used herein are defined relative to the measuring axis 106. The term "length" generally refers to dimensions extending parallel to the measuring axis 106 and "width" generally refers to dimensions extending perpendicular to the measuring axis 106 in the plane of the scale member 104.

As shown in FIG. 1, the flux modulators 124 decrease in width across the scale member 104 as the set 122 of flux modulators 124 extends along the measuring axis 106 from left to right. In contrast, the flux modulators 144 increase in width across the scale member 104 as the set 142 of flux modulators 144 extends along the measuring axis 106 from left to right. The far right flux modulator 124 is the same width as the far left flux modulator 144. Further, the far left flux modulator 124 is the same width as the far right flux modulator 144. The dimension of and spacing of each flux modulator 124 and 144 in the first and second sets 122 and 124 is uniform along the measuring axis 106. That is, the length along the measuring axis 106 of all the flux modulators 210 is uniform.

Figure 2:
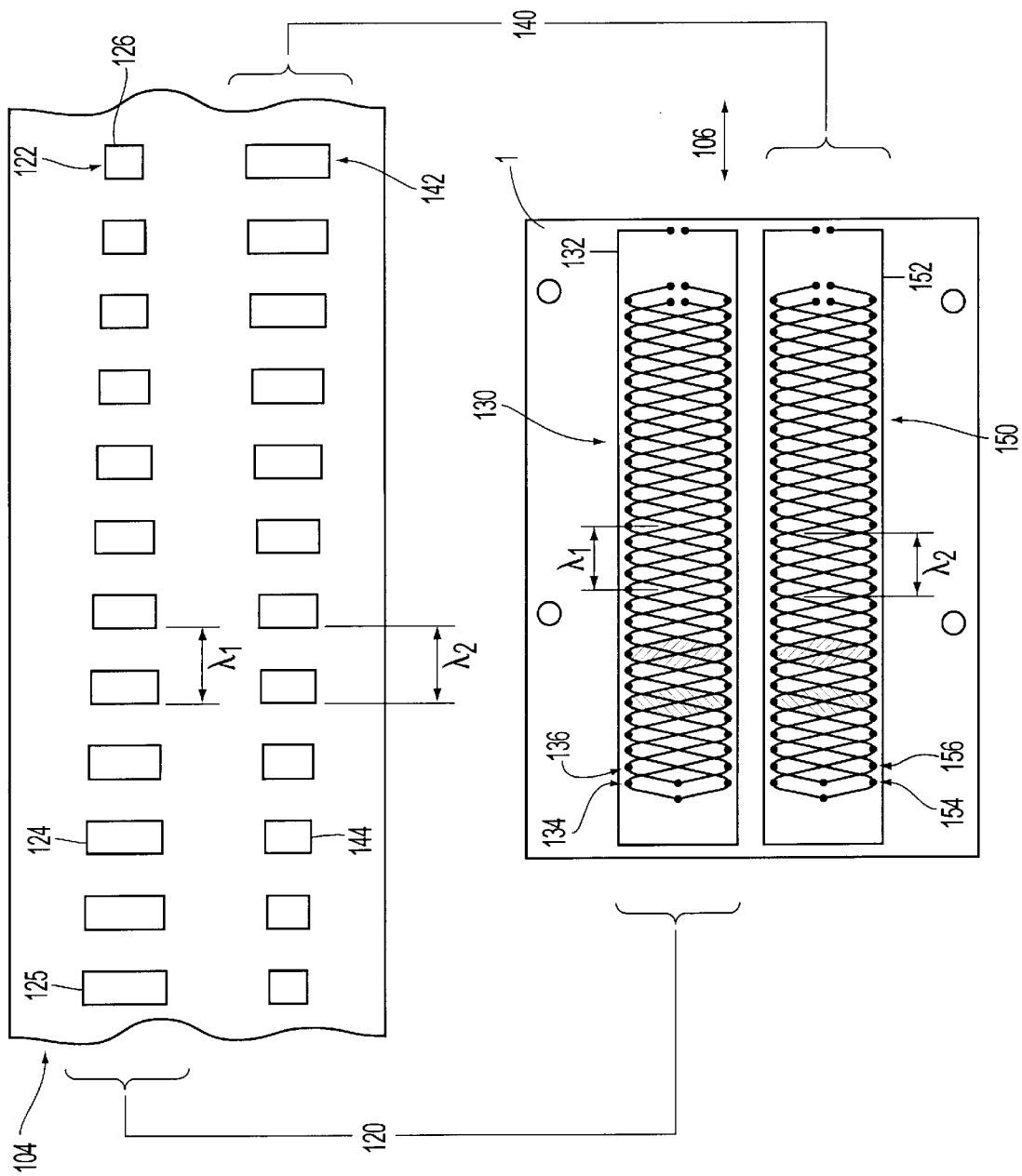
FIG. 2 is a top plan view showing a single scale track and the associated transmitter and receiver windings of a two-track inductive absolute position transducer according to this invention.

FIG. 2 shows portions of the scale member 104 and the read head 114. As shown in FIG. 2, the transducer windings 130 formed on the read head 114 include at least one transmitter winding 132 and at least two receiver windings 134 and 136. As shown in FIG. 1, the transducer windings 150 include a transmitter winding 152 and at least two receiver windings 154 and 156. However, this invention is not limited to such an arrangement. For example, the read head 114 could include one common transmitter winding operatively associated with all of the receiver windings 134, 136, 154 and 156. The transducer windings 130 and 150 are respectively operatively associated with the sets of flux modulators 122 and 142, respectively. The construction and various exemplary layouts of the transducer windings 130 and 150 and the associated flux modulating elements are fully disclosed in the incorporated 274 patent and the incorporated 268 application.

Figure 3:
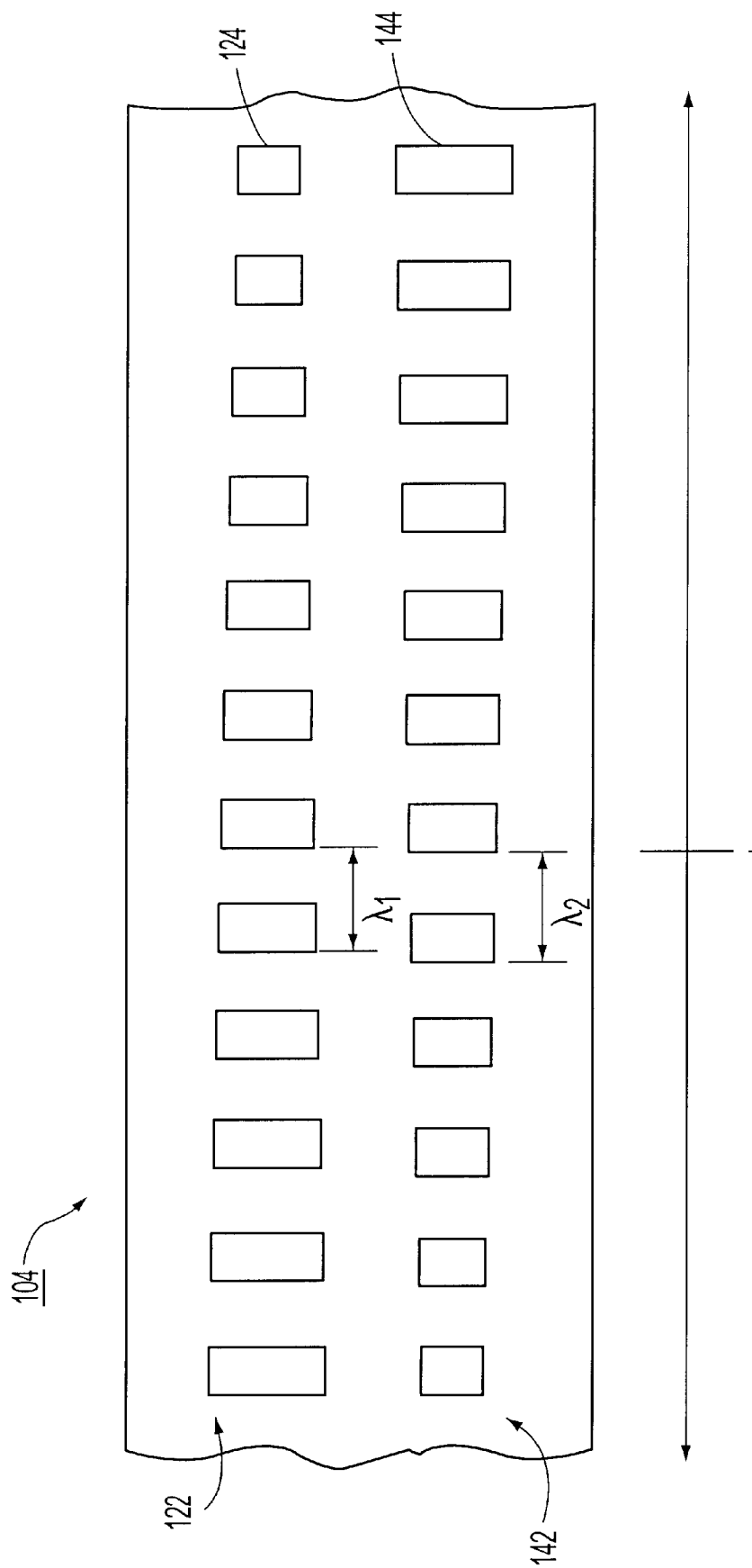
FIG. 3 is a top plan view showing the scale member of the two-track inductive absolute position transducer according to this invention.

In accordance with this invention, as shown in FIGS. 1–3, the size of the flux modulators 124 and 144 across the scale member 104 is not the same. Rather, the width of the flux modulators 124 and 144 varies in a predetermined manner along the measuring axis 106. As disclosed in the incorporated 274 patent, the flux modulators 124 and 144 interact with the changing magnetic flux generated by the corresponding transmitter winding 132 or 152 to generate a spatially modulated magnetic flux. The spatially modulated magnetic flux generated by each of the sets of flux modulators 122 and 142 causes the signal output from each of the corresponding receiver windings 134 and 136, or 154 and 156, to have aphase that is spatially dependent upon the relative position between the read head 114 and the scale member 104. This is fully described in the incorporated 274 patent and will not be further described herein.

However, as described in the incorporated 274 patent, in the transducer systems described in the 274 patent, the flux modulators all had the same length and width dimensions. As a result, each flux modulator provided a substantially identical amount of flux modulation that resulted in substantially identical amounts of net electromotive force (EMF) in each of the modulated loops of the receiver windings. In contrast, as shown in FIGS. 1–3, because the flux modulators 124 and 144 have widths (or other relevant parameters) that vary as a function of their positions along the measuring access, the net EMF in the receiver windings 134 and 136, and 154 and 156, resulting from any particular flux modulating 124 or 144 is different than that resulting from any other flux modulator 124 or 144.

Because the net EMF in each loop of the receiver windings 134 and 136, or 154 and 156, will be different from the other loops, each of the receiver windings 134 and 136, or 154 and 156, will have a net EMF, and thus a net signal amplitude, that depends upon the position of the read head 114 relative to the scale member 104. However, because the length and spacing of the flux modulators 124 and 144 does not vary along the length of the measuring axis 106, the phase position of the signals output from the receiver windings 134 and 136, or 154 and 156, is position dependent along the measuring axis only within one wavelength of the corresponding transducer 120 or 140. This is described in greater detail below.

Illustratively, the flux modulators 124 include individual flux modulators, such as the flux modulators 125 and 126. The flux modulator 125 has a first width, while the flux modulator 126 has a second width that is different than the first width of the flux modulator 125. In operation, one or both of the flux modulators 125 and 126 may be positioned adjacent to the transducer windings 130, depending on the relative position between the read head member 114 and the scale member 104. When one or both of the flux modulators 125 and 126 are positioned adjacent the transducer windings 130, and a time-varying signal is applied to the transmitter winding 132, the transmitter winding 132 generates a changing magnetic flux in a flux region that encompasses one or both of the flux modulators 125 and 126. Because the flux modulator 125 is wider than the flux modulator 126, a larger amount of the changing magnetic flux will interact with the flux modulator 125 than will interact with the flux modulator 126.

If the flux modulators 124 are flux disruptors, placing the flux modulators 124 in the flux region formed by the transmitter winding 132 generates eddy currents into the flux modulators 124. These eddy currents generate counter magnetic fluxes. The magnitude of the counter magnetic fluxes generated by the flux-disrupter-type flux modulators 124 is proportional to the area of the flux modulators 124. Because the flux modulators 124 have a consistent length, the area of the flux modulators 124 is linearly proportional to the width of the flux modulators 124.

The net electromotive force generated in each loop of the receiver windings 134 and 136 is a function of the net magnetic flux passing through that loop. The net magnetic flux passing through any one loop depends upon the amount of overlap of that loop with an underlying flux modulator 124. In the incorporated 274 patent, because the flux modulators had consistent lengths and widths, the amount of overlap with the flux modulators were solely a function of the relative position of the receiver windings along the measuring axis 106 within one wavelength of the corresponding transducer.

In contrast, in the transducers according to this invention, the amount of overlap is a function of both the relative position of the flux modulators and the receiver windings along the measuring axis within one wavelength, as well as the relative position of the flux modulators 124 and the receiver windings 134 and 136 along the extent of the measuring axis 106.

Thus, in the transducers disclosed in the incorporated 274 patent, the net EMF in each loop for any particular relative position between the read head and the scale was the same. In contrast, in the transducer 120 shown in FIG. 2, the net EMF induced in the individual loops in the receiver windings 134 and 136 is not the same for any given position of the read head 114 relative to the scale member 104 along the measuring axis 106. This occurs because, in the transducers 120 and 140 of this invention, the amount of overlap is a function not only of the relative position of the loops within the receiver windings 134 and 136 relative to the flux modulators 124 along the measuring axis 106, but also the particular widths across the measuring axis 106 of the particular flux modulators 124 that are adjacent to the receiver windings 134 and 136.

If the flux modulators 124 were flux enhancers, such flux modulators 124 would act to increase, rather than decrease, the amount of magnetic flux passing through adjacent ones of the loops of the receiver windings 134 and 136 based on the amount of overlap between the flux-enhancing-type flux modulators 124 and the loops of the receiver windings 134 and 136. Thus, as the positions of the flux modulators 124 change relative to the receiver windings 134 and 136 along the measuring axis 106, the amplitude of the signals generated from the receiver windings 134 and 136 varies continuously.

As shown in FIG. 3, the transducer 100 includes the first set, or track, 122 of flux modulators 124 of the transducer 120 as well as the second set, or track, 142 of the flux modulators 144 of the transducer 140. The tracks 122 and 142 are positioned on the scale 104 and extend from one end of the scale 104 to the other end of the scale 104 along a predetermined length "L". More specifically, this length may be characterized as a distance from –L/2 to +L/2.

Further, the flux modulators 124 and 144 of each track 122 and 142 are positioned at particular fine wavelengths $\lambda_1$ and $\lambda_2$ respectively. The two fine wavelengths, $\lambda_1$ and $\lambda_2$, define an absolute position over a coarse wavelength $\lambda_c$, where the length of the coarse wavelength is $\lambda_c=(\lambda_1\lambda_2)/(\lambda_1-\lambda_2)$. As shown in FIG. 2, and described in greater detail in the incorporated 274 patent, the receiver windings 134 and 136, and 154 and 156, of the transducers 120 and 140, respectively, are typically in quadrature, i.e., offset relative to each other by a distance that is equal to one quarter of the corresponding fine wavelengths $\lambda_1$ and $\lambda_2$, respectively. Thus, the output signals from the receiver windings 134 and 136, and 154 and 156, are offset by 90° of phase. That is, the output signals from the receiver windings 134 and 136, and from the receiver windings 154 and 156, are in a sine/cosine relationship.

Thus, in a transducer where the flux modulators do not vary across the width of the scale member, such as the transducers disclosed in the incorporated 274 patent, the signals output by the receiver windings arranged in quadrature are:

$$V_{1,sin}=A^*\sin(2\ \pi x/\lambda_1) \quad (1)$$

$$V_{1,cos}=A^*\cos(2\ \pi x/\lambda_1) \quad (2)$$

where:

$V_{1,sin}$ is the signal output from the sine-phase receiver winding;

$V_{1,cos}$ is the signal output from the cosine-phase receiver winding;

A is the amplitude of the signals;

$\lambda_1$ is the fine wavelength of the first transducer; and x is the position of the read head 114 relative to the scale member 104.

Moreover, in systems having second transducers having receiver windings arranged in quadrature and a fine wavelength $\lambda_2$ that is different from the fine wavelength $\lambda_1$ of the first transducer, the output signals from the receiver windings are:

$$V_{2,sin}=B^*\sin(2\ \pi x/\lambda_2) \quad (3)$$

$$V_{2,cos}=B^*\cos(2\ \pi x/\lambda_2) \quad (4)$$

where:

$V_{2,sin}$ is the signal output from the sine phase receiver winding of the second transducer;

$V_{2,cos}$ is the signal output from the cosine phase receiver winding of the second transducer;

B is the amplitude of the signals;

$\lambda_2$ is the wavelength of the second transducer; and x is the position of the read head 114 relative to the scale member 104.

The relationship set forth in Eqs. 1–4 provides signals which in turn may be used to generate an indication of a measured position. More specifically, Eqs. 1–4 each allows a fine position measurement to be determined, by solving for "x". In particular, because the output signals $V_{1,sin}$, $V_{1,cos}$, $V_{2,sin}$ and $V_{2,cos}$ are cyclic over the corresponding fine wavelengths $\lambda_1$ and $\lambda_2$, each fine position can only be determined within a single fine wavelength $\lambda_1$ and $\lambda_2$. Because the first and second wavelengths $\lambda_1$ and $\lambda_2$ are different, the position of the read head relative to the scale within the coarse wavelength $\lambda_c$ can be determined from:

$$P_c=\tan^{-1}(V_{1,sin}/V_{1,cos})-\tan^{-1}(V_{2,sin}/V_{2,cos}). \quad (5)$$

where $P_c$ is a coarse spatial phase that determines the coarse-resolution absolute position within the coarse wavelength $\lambda_c$, and $V_{1,sin}$, $V_{1,cos}$, $V_{2,sin}$, and $V_{2,cos}$ are the values obtained from Eqs. 1–4 above.

In using Eq. 5 to determine an absolute position within the coarse wavelength $\lambda_c$ it should be recognized that the respective amplitudes A and B of the first and second transducers drop out. Thus, if the respective amplitudes A and B are not position invariant, as in the incorporated 274 patent, but are rather position-dependent, as in the transducers 120 and 140 described above, this position does not interfere in the ability of the absolute position to be determined within a single coarse wavelength $\lambda_c$.

As described above and described in more detail in the incorporated 274 patent, in conventional absolute position encoders, the absolute range of the absolute position transducer can be extended by adding a third transducer having a third fine wavelength $\lambda_3$ that is different from both the fine wavelengths $\lambda_1$ and $\lambda_2$ of the first and second transducers. As described in the 274 patent, an absolute position in such a 3-track absolute position transducer is obtained by determining a coarse absolute position at a coarse resolution using two of the three tracks to generate a coarse wavelength as outlined above. Because of the resolution limits, this coarse wavelength is used to identify a particular medium wavelength. The coarse wavelength extends at least as long as the length L of the transducer, while there are multiple medium wavelengths within this coarse wavelength.

The medium wavelengths are themselves generated as outlined above using a different set of the two transducers. As in the coarse to medium analysis, a plurality of the fine wavelengths of one of the transducers is a multiple of the medium wavelength, such that there are plurality of fine wavelengths within the medium wavelength. The medium wavelength is then used to identify the particular fine wavelength corresponding to the relative position of the read head relative to the scale.

That is, the coarse absolute position measurement identifies a particular one of the medium wavelengths corresponding to the relative position of the read head relative to this scale. The identified medium wavelength is then used to identify a particular one of the fine wavelengths corresponding to the relative position of the read head relative to the scale. Because this uniquely identifies the relative position of the read head relative to the scale within a single fine wavelength, and Eqs. 1 and 2, or Eqs. 3 and 4, can be used to uniquely identify the relative position of the read head relative to the scale within a single fine wavelength, the absolute position of the read head relative to the resolution of the fine scale is determined.

According to this invention, instead of providing the coarsest wavelength of the absolute position transducer based on the phase relationships between two fine wavelength transducers, the coarsest wavelength of the absolute position transducer can be instead defined by making the amplitudes A and/or B of the transducers 120 and 140 vary in a predetermined manner over the length L of the absolute position transducer.

Thus, as outlined above, in a first exemplary embodiment of the absolute position transducer system according to this invention, as exemplified by the absolute position caliper 100, both the first set 122 of flux modulators 124 and the second set 142 of flux modulators 144 are provided with flux modulators 124 and 144 that vary in width, as shown in FIG. 3. As shown in FIG. 3, the respective widths of the flux modulators 124 and 144 continuously vary from one end of the scale 104 to the other end of the scale 104. As a result of the varying widths of the flux modulators 124 and 144, a spatial dependence is introduced into the amplitudes A and B of the signals generated in the receiver windings 134 and 136, and 154 and 156, respectively. The use of this spatial dependence of the amplitudes A and B of the signals generated by the receiver windings 134 and 136, and 154 and 156, may be characterized as adding an additional degree-of-freedom to the transducer of the invention.

Thus, the amplitudes A and B of the signals generated by the receiver windings 134 and 136, and 154 and 156 are dependent on the relative position x between the read head 114 and the scale member 104 along the measuring axis 106. That is, in contrast to Eqs. 1–4, the amplitudes A and B become functions of x:

$$V_{1,sin} = A(x)*\sin(2\pi x/\lambda_1) \quad (6)$$

$$V_{1,cos} = A(x)*\cos(2\pi x/\lambda_1) \quad (7)$$

$$V_{2,sin} = B(x)*\sin(2\pi x/\lambda_2) \quad (8)$$

$$V_{2,cos} = B(x)*\cos(2\pi x/\lambda_2) \quad (9)$$

To explain further, as the read head 114, for example, moves relative to the flux modulators 124, the magnitude of the output generated in the receiver windings 134 and 136 will vary depending on the widths of the modulators 124 positioned adjacent to the receiver windings 134 and 136. That is, the flux modulators 124 will generate a signal in the receiver windings 134 and 136 that has an amplitude that varies as a function not only of the relative position between the flux modulators 122 and the receiver windings 134 and 136 along the measuring axis, 106, but also as a function of which flux modulators 124 the receiver windings 134 and 136 are positioned adjacent to. Specifically, the spatially-dependent amplitudes A(x) and B(x) can be derived from the measured signals as:

$$A(x) = \sqrt{V_{1,sin}^2 + V_{1,cos}^2} . \quad (10)$$

$$B(x) = \sqrt{V_{2,sin}^2 + V_{2,cos}^2} . \quad (11)$$

where $V_1$ and $V_2$ are the spatially dependent signals generated from the receiver windings 134 and 136, or the receiver windings 154 and 156, respectively.

Using these relationships, the position dependent amplitudes, A(x) and B(x) may be obtained in a very simple manner from the output from the receiver windings 134 and 136, and 154 and 156. Accordingly, the signal generating and processing circuits 116, such as those disclosed in the incorporated 274 patent and the incorporated 268 application, may be used in conjunction with this invention.

As described above, the flux modulators 124 and 144 linearly vary in width. As a result, for example, assuming the flux modulators 124 and 144 are flux disruptors, the amplitude A(x) will have a maximum amplitude when the receiver windings 134 and 136 are positioned above the modulators 124 placed at the far right of the scale member 104, as shown in FIG. 3. This maximum amplitude results because the flux modulators 124 placed at the far right of the scale member 104 are the smallest. Conversely, the amplitude A(x) observed when the receiver windings 134 and 136 are positioned at the far left of the scale members 104 will have a minimum value. Similarly, the amplitude B(x) will have a minimum amplitude when the receiver windings 154 and 156 are positioned above the flux modulators 144 placed at the far right of the scale member 104, as shown in FIG. 3. Conversely, the amplitude B(x) observed when the receiver windings 154 and 156 are positioned at the far left of the scale member 104 will have a maximum value. This minimum amplitude results because the modulator 144 at the far right of the track 142 is the largest and, as a result, will modulate the flux to the greatest degree.

Figure 4:
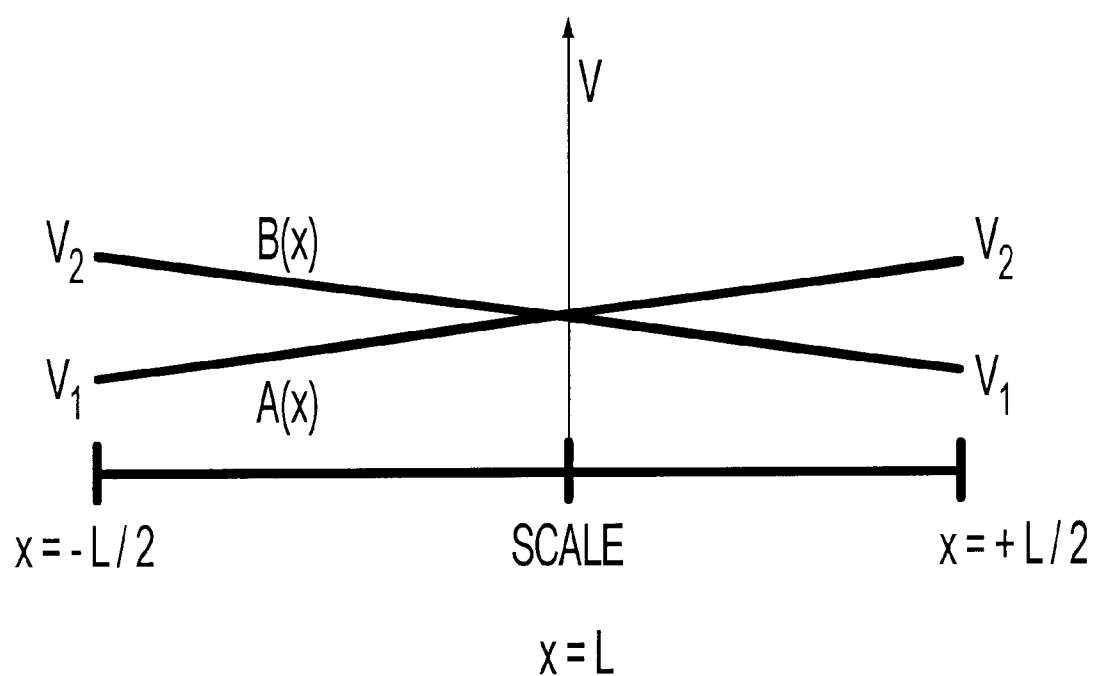
FIG. 4 is a graph showing the spatially-dependent amplitude output signals from the receiver windings of the two-track inductive absolute position transducer having the two sets of modulator scale elements shown in FIG. 3 as a function of position according to this invention.

This relationship is shown in FIG. 4. FIG. 4 is a graph showing the respective amplitudes A(x) and B(x) of the signals output from the receiver windings 134 and 136, and 154 and 156, respectively, as the read head 114 moves along the length "L" of the scale 104. Specifically in FIG. 4, the amplitudes A(x) and B(x) are shown as the read head 114 moves along the length of the scale from the far left end of the scale member 104 at a position defined as –L/2 to the far right end of the scale member 104 at a position defined as +L/2. As illustrated in the graph in FIG. 4, the amplituded A(x) is at a minimum value at the left end of the scale at –L/2 and at a maximum value at the right end of the scale at +L/2.

The relationships illustrated in FIG. 4 may be quantitatively expressed as:

$$A(x) = \frac{V_1 + V_2}{2} + \frac{V_2 - V_1}{L} x \quad (12)$$

$$B(x) = \frac{V_1 + V_2}{2} - \frac{V_2 - V_1}{L} x \quad (13)$$

where:

$V_1$ is the minimum signal amplitude;

$V_2$ is the maximum signal amplitude;

L is the total length of the scale member; and x is the relative position of the read head relative to the scale and varies from −L/2 to +L/2. FIG. 4 and Eqs. 13 and 14 illustrate that the position dependent voltages A(x) and B(x) vary linearly as the read head 114 moves relative to the scale member 104 along the measuring axis 106.

It should be recognized that the minimum and maximum amplitudes $V_1$ and $V_2$ are fixed based on the design of the transducer 100 and do not vary during operation of the transducer 100. Rather, the minimum and maximum amplitudes $V_1$ and $V_2$ are determined based on the specific construction of both the flux modulators 124 and 144 and the receiver windings 134, 136, 154 and 156.

As should be apparent, the relationships of Eqs. 12 and 13 are linearly dependent. In accordance with this invention, the ratio (A−B)/(A+B) is insensitive to changes in the signal amplitudes. Illustratively, such changes in signal amplitudes might result in some cases from degradations in the construction of the transducer. These degradations may include gap variations and gain drifts, for example.

Further, the ratio (A−B)/(A+B) may be usefully expressed by the relationship:

$$\frac{A-B}{A+B} = 2\frac{V_2 - V_1}{V_2 + V_1}\frac{x}{L}. \tag{14}$$

The ratio (A−B)/(A+B) can be determined easily from the measured signals output from the receiver windings 134, 136, 154 and 156. The ratio $(V_2-V_1)/(V_2+V_1)$ and the length L are design constants. Thus, once the ratio (A−B)/(A+B) is determined, the only unknown left in Eq. 14 is the relative position x. Therefore, Eq. 14 can be reformed as:

$$x = \frac{L}{2}\frac{(A-B)}{(A+B)} \cdot \frac{(V_2 + V_1)}{(V_2 - V_1)}. \tag{14a}$$

Figure 5:
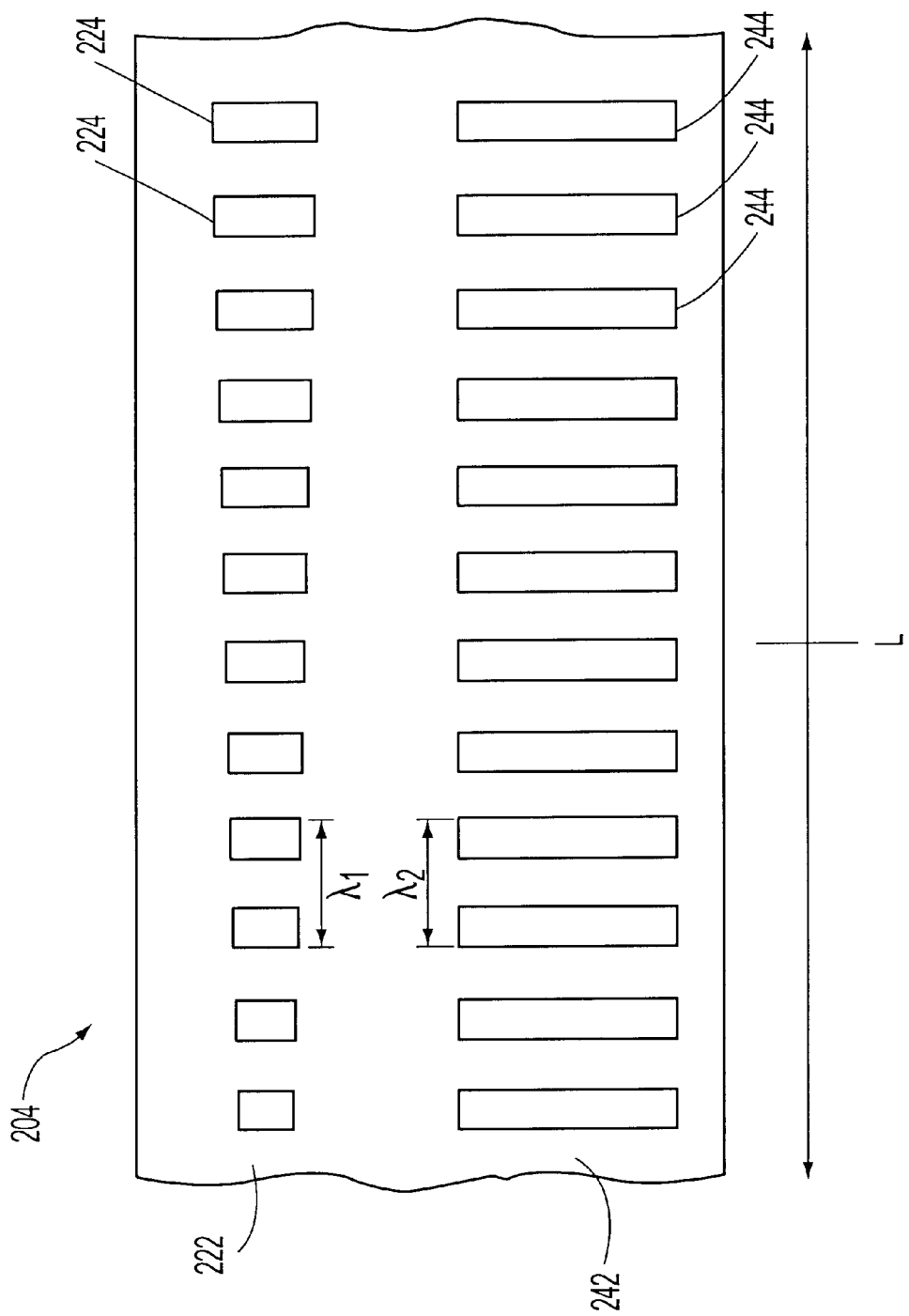
FIG. 5 is a plan view of another exemplary embodiment of a scale of the two-track inductive absolute position transducer including one track of flux modulators of varying width and one track of flux modulators of uniform width according to this invention.

FIG. 5 shows a scale member 204 in accordance with a second embodiment of the position transducer 100 of this invention. As shown in FIG. 5, the scale 204 includes two sets 222 and 242 of flux modulators 224 and 244, respectively. The flux modulators 224, like the flux modulators 122, vary in width. As shown in FIG. 5, the flux modulators 224 increase in width from left to right. As a result, for example, when the flux modulators 224 are flux enhancers, the amplitude A(x) will have a maximum value when the read head 114 is positioned above the modulators 224 placed at the far right of the scale member 204. This maximum amplitude results because the flux modulator 224 at the far right end of the scale member 204 is the largest, and as a result, will modulate the flux to the greatest degree. Conversely, the amplitude A(x) observed when the receiver windings 134 and 136 are positioned at the far left of the scale member 204 will have a minimum value.

However, in contrast to the exemplary embodiment of the absolute position transducer 100 shown in FIGS. 1–3, the flux modulators 244 have the same width. That is, the width of the flux modulators 244 is consistent along the length of the scale member 204. As a result, the fundamental amplitude B of the signal generated by the receiver windings 154 and 156 will not change as the read head 114 moves relative to the scale member 204 along the measuring axis 106.

Figure 6:
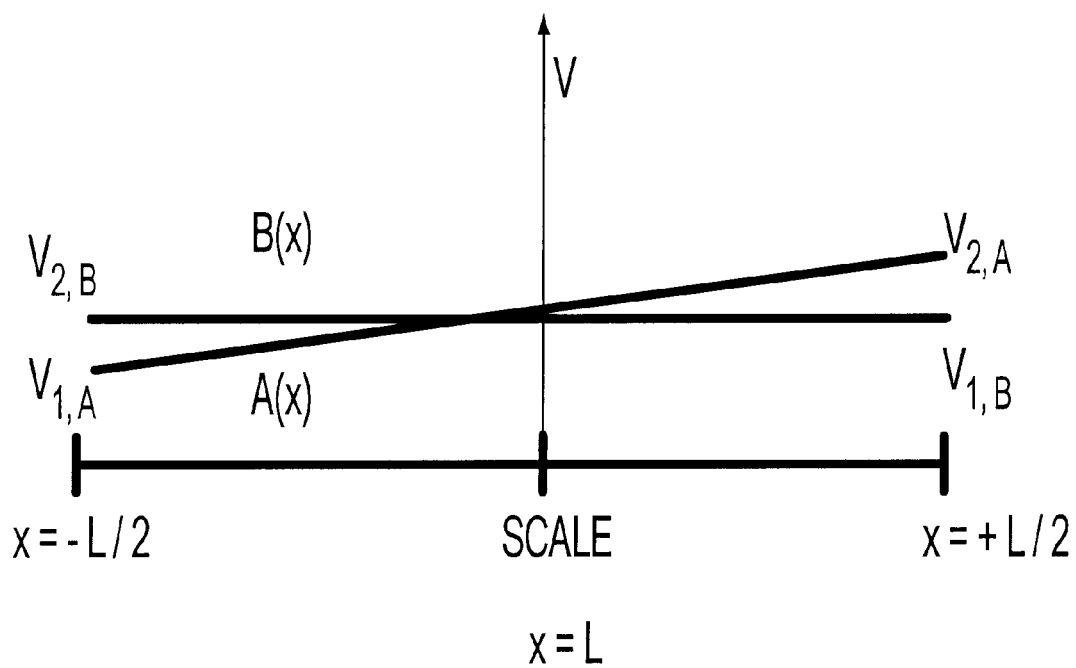
FIG. 6 is a graph showing the spatially-dependent amplitude output signals from the receiver windings of the two-track inductive absolute position transducer interacting with the two sets of flux modulators shown in FIG. 5 as a function of position according to this invention.

FIG. 6 graphically shows the fundamental amplitudes A(x) and B of the signals of the receiver winding 134 and 136, and 154 and 156, as the read head 114 moves relative to the scale member 204 along the measuring axis. As illustrated in FIG. 6, the fundamental amplitude A(x) is at a minimum value at the left of the scale at −L/2 and at a maximum value at the right end of the scale at +L/2, as in FIG. 4.

As described above, the width of the flux modulators 244 does not vary. As a result, the fundamental amplitude B of the signals output by the receiver windings 154 and 156 is constant. This constant amplitude results because all the flux modulators 244 will modulate the flux to the same degree. The relationship for A(x) illustrated in FIG. 6 may be quantitatively expressed as:

$$A(x) = \frac{V_1 + V_2}{2} + \frac{V_2 - V_1}{L}x \tag{15}$$

Further, for the exemplary embodiment shown in FIGS. 5 and 6, assuming $B = (V_1 + V_2)/2$, the ratio (A−B)/(A+B) may be usefully expressed by the relationship: IF B=CONSTANT, then just use the ratio A(x)/B. No need to use the more complicated expression below $$(A-B)/(A+B) = \frac{(V_2 - V_1)x}{(V_2 + V_1)L + (V_2 - V_1)x} \tag{16}$$

The absolute position caliper 100 as shown in FIG. 1 includes two incremental transducers 120 and 140. However, an absolute position transducer according to this invention may be constructed using only a single transducer that uses a spatially dependent amplitude measurement as a coarse wavelength and a spatially dependent phase position measurement as a fine wavelength. The set of flux modulating elements of this absolute position transducer would include a set of flux modulators or flux coupling loops that vary in width, as described above. In particular, the absolute position to a coarse resolution would be determined using Eqs. 10 and 12 to identify a coarse absolute position to a first resolution and thus identify a particular one of the fine wavelengths over which the phase position varies. The outputs of the two receiver windings in quadrature would then be used to identify the phase position within the identified fine wavelength as disclosed in the incorporated 274 patent or the incorporated 268 application.

In such a one-track position transducer, the determination of the coarse measurement using Eqs. 10 and 12 depends on the amplitude of the generated signal, and more specifically, on the variance of the amplitude of the generated signal. Further, as the variance of the amplitude of the signal increases, the sensitivity of the coarse measurement increases.

However, determining the phase position within a fine wavelength also depends on the relationship between the phase of the signals from the two receiver windings and the amplitude of the signals from the two receiver windings. Thus, making the fundamental amplitude of the signal position dependent may adversely effect the accuracy of the fine measurement. To explain, determining the phase position within a fine wavelength receiver involves observing the sine and cosine signals from the receiver windings. With a signal of constant fundamental amplitude, the phase position is easy to obtain from the amplitudes of the signals. However, if the receiver windings are in fact generating output signals having a varying fundamental amplitude, relative amplitudes in the receiver windings is a function of both the change in fundamental amplitude and the phase-position-dependent amplitude. While this adverse effect may be remedied by various known calculations, modifying the signal generating and processing circuit 116 to implement these calculations increases cost of the absolute position transducer.

Accordingly, in such a one-track absolute position transducer according to this invention, it should be recognized that there is essentially a trade-off in increasing the variance of the amplitude. Specifically, as the variance of the amplitude increases, the accuracy of the coarse position measurement will increase. However, as the variance of the amplitude increases, the accuracy of the fine position measurement will decrease or will require additional signal processing.

Figure 7:
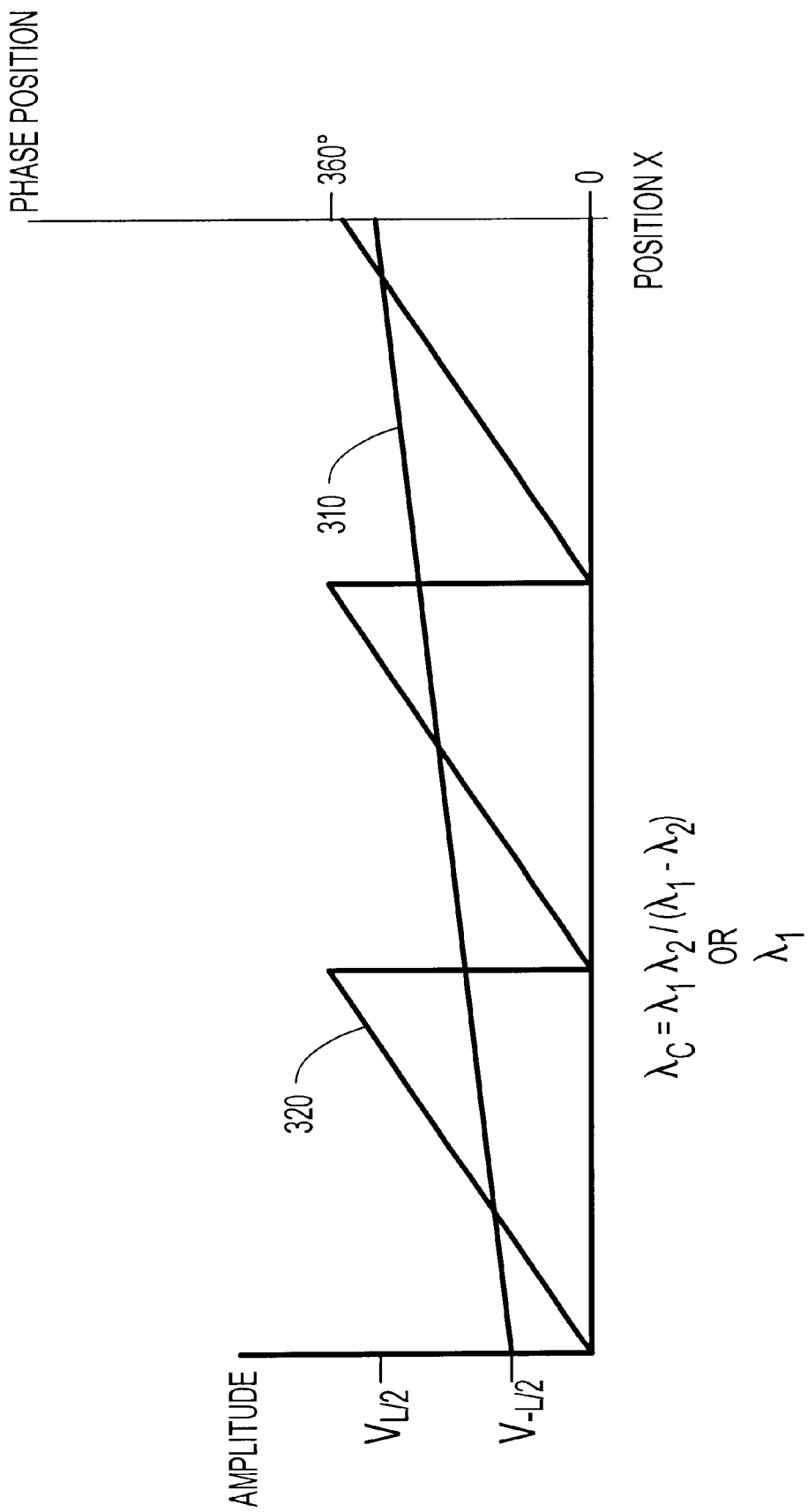
FIG. 7 is a graph showing the spatially-dependent amplitude and spatially-dependent phase position of the output signals of the windings of an inductive absolute position transducer as a function of position according to this invention.

FIG. 7 shows the relationship between the amplitude-position measurement, represented by line 310 and the phase-dependent measurement, represented by line 320. As set forth above, the ratio shown in FIG. 4 or FIG. 6 will vary from $V_{-L/2}$ and $V_{+L/2}$ as the position of the read head 114 relative to the scale member 104 or 204 changes over the length L of the scale member 104 or 204. At the same time, for the scale members 104 and 204 shown in FIGS. 1–6, the phase position of the coarse phase dependent measurement represented by line 320 varies from 0 to 360° over each coarse wavelength $\lambda_c$. Thus, by measuring the position dependent amplitudes A(x) and/or B(x), the value of the ratio shown in FIG. 4 or FIG. 6 can be used to identify the proper coarse wavelength $\lambda_c$. The phase position within the coarse wavelength $\lambda_c$ can be used to identify a fine or medium wavelength $\lambda_f$ or $\lambda_m$, as described in the incorporated 274 patent.

Alternatively, in the one-track position transducer discussed above, the line 310 can be used to identify a particular fine wavelength $\lambda_1$ of the one-track absolute position transducer.

In the exemplary embodiment described above and shown in FIGS. 1–6, the spatial dependence of the fundamental amplitudes A(x) and/or B(x) is accomplished by varying the width of the flux modulators 122, 144 and 224. However, there are a variety of ways in which the spatial dependence of the fundamental amplitudes A(x) and B(x) may be generated by altering the construction of the scale.

Illustratively, the spatial dependence of the fimdamental amplitudes A(x) and/or B(x) may be provided by gradually reducing the area or shape of each flux modulating element across the scale member as the flux modulating elements are arranged along the scale member in any of a variety of ways. Alternatively, the spatial dependence of the fundamental amplitudes A(x) and/or B(x) may be provided by providing a loss mechanism in conjunction with each flux modulating element. For example, the loss mechanism may be disposed within each modulator element. For example, each loss mechanism may be one or more holes of varying shapes and areas located within the flux disruptors or flux enhancers. The shapes and/or sizes of the hole or holes would vary along the measuring axis 106. Additionally, the spatial dependence of the fundamental amplitudes A(x) and/or B(x) may be provided by changing the properties of each scale element. For example, the thickness or resistivity of the flux disruptors may be changed along the measuring axis 106. Likewise, the magnetic permeability of the flux enhancers may vary along the measuring axis 106.

Moreover, in accordance with the exemplary embodiment of the absolute position transducer system of the invention, shown in FIGS. 5 and 6, one of the sets of flux modulators may have uniform properties and one of the sets of flux modulators may have varying properties.

Figure 8:
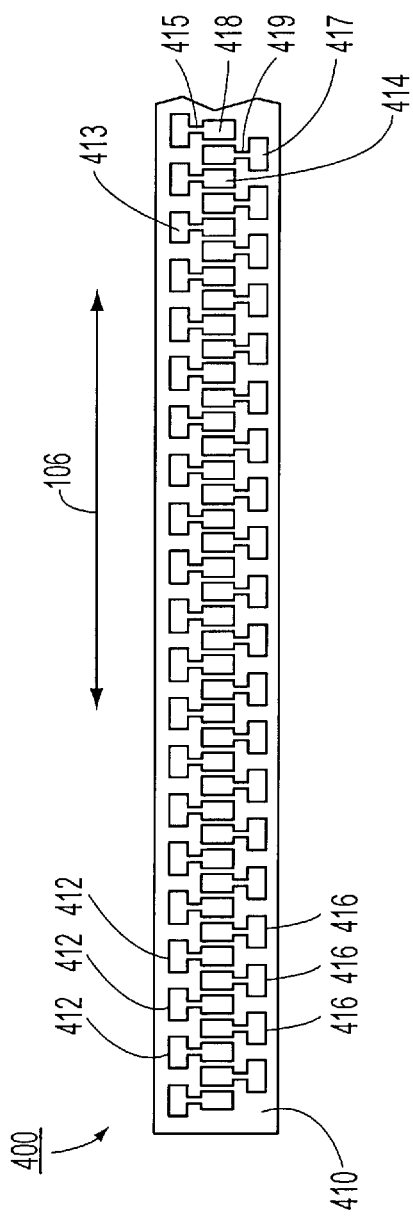
FIG. 8 shows a second exemplary embodiment of an inductive absolute position transducer of the scale member that uses flux coupling loops as the flux modulating elements.

Further, other types of flux modulating elements beyond flux modulators may also be used in other exemplary absolute position transducers according to this invention. Illustratively, the flux coupling loops as disclosed in the incorporated 268 application may be modified and used in conjunction with this invention. FIG. 8 shows an exemplary embodiment of a reduced-offset induced current position transducer 400. As shown in FIG. 8, the reduced-offset scale 410 member includes a first plurality of coupling loops 412 interleaved with a second plurality of coupling loops 416. Each of the coupling loops 412 and 416 is electrically isolated from the others of the first and second plurality of coupling loops 412 and 416.

Each of the first plurality of coupling loops 412 includes a first loop portion 413 and a second loop portion 414 connected by a pair of connecting conductors 415. Similarly, each of the second plurality of coupling loops 416 includes a first loop portion 417 and a second loop portion 418 connected by apair of connecting conductors 419.

In the first plurality of coupling loops 412, the first loop portions 413 are arranged along one lateral edge of the scale member 410 and are arrayed along the measuring axis 106. The second loop portions 414 are arranged along the center of the scale member 410 and are arrayed along the measuring axis. The connecting conductors 415 extend perpendicularly to the measuring axis 106 to connect the first loop portions 413 to the second loop portions 414.

In the second plurality of coupling loops 416, the first loop portions 417 are arranged along one lateral edge of the scale member 410 and are arrayed along the measuring axis 414. The second loop portions 418 are arranged along the center of the scale member 410 and are arrayed along the measuring axis. The connecting conductors 419 extend perpendicularly to the measuring axis 106 to connect the first loop portions 417 to the second loop portions 418.

Figure 9:
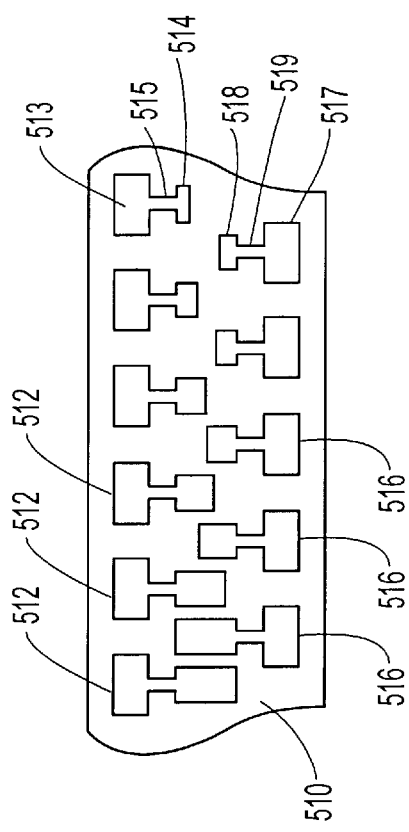
FIG. 9 shows the flux coupling loops of the scale member shown in FIG. 8 modified according to this invention.

The coupling loops 412 and 416 shown in FIG. 8 may be easily modified according to this invention, as shown in FIG. 9 to create a reduced-offset induced current position transducer corresponding to the one-track transducer previously described. As shown in FIG. 9, the modified reduced-offset scale member 510 includes a first plurality of closed-loop coupling loops 512 interleaved with a second plurality of closed-loop coupling loops 516.

As shown in FIG. 9, each of the first plurality of coupling loops 512 includes a first loop portion 513 and a second loop portion 514 connected by apair of connecting conductors 515. Similarly, each of the second plurality of coupling loops 516 includes a first loop portion 517 and a second loop portion 518 connected by a pair of connecting conductors 519. Each of the coupling loops 512 and 516 is electrically isolated from the others of the first and second plurality of coupling loops 512 and 516.

The first loop portion 513 in each coupling loop 512 is the same size as each loop portion 517 in each coupling loop 516. However, as shown in FIG. 9, the second length of the loop portions 514 in the coupling loops 512 are not the same width across the scale member 510. Specifically, the second loop portions 514 progressively vary in internal area in a direction across the length ofthe scale member 510. The second loop portions 518 of the second coupling loops 516 also progressively vary in width. As a result, the flux induced in the receiver windings positioned above the second loop portions 514 and 518 will vary depending on the particular second loop portions 514 and 518 the receiver windings are coupled to. This varying induction coupling causes the fundamental amplitude of the signals at the receiver windings to vary as the read head moves relative to the scale member 510 along the measuring axis 106. This variance in amplitude may be used in conjunction with Eq. 12, as described above, to increase the absolute measuring range of the absolute position transducers disclosed in the incorporated 268 application.

Figure 10:
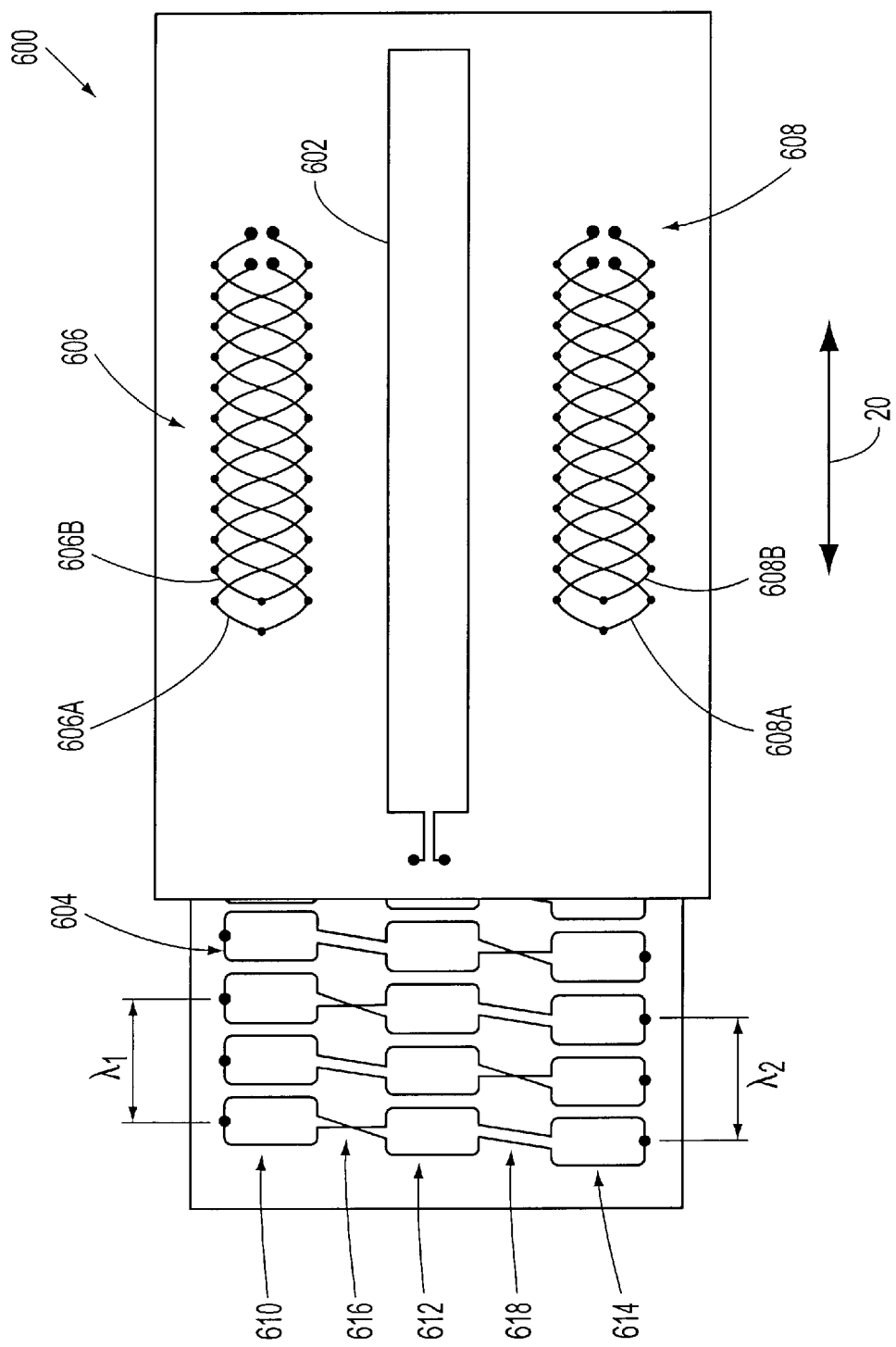
FIG. 10 shows another exemplary embodiment of an inductive absolute position transducer of the scale member that uses flux coupling loops as the flux modulating elements.

Further, other types of flux modulating elements may also be used in other exemplary absolute position transducers according to this invention. Illustratively, the flux coupling loops as disclosed in the 268 application may be modified and used in conjunction with this invention. FIG. 10 shows an exemplary embodiment of a reduced-offset induced current absolute position transducer 600. As shown in FIG. 10, the reduced-offset absolute position transducer 600 includes a plurality of coupling loops 604, a first receiver winding group 606 and a second receiver winding group 608. The plurality of coupling loops 604 each includes a first coupling loop portion 610, a second coupling loop portion 612 and a third coupling loop portion 614. The first coupling loop portions 610 are connected to the second coupling loop portions 612 by connecting conductors 616 and the second coupling loop portions 612 are connected to the third coupling loop portions 614 by connecting conductors 618. Every other one of the first connecting conductors 616 and the second connecting conductors 618 are twisted to spatially modulate the polarities of the first, second and third coupling loop portions 610, 612 and 614 along the measuring axis 620.

The receiver winding groups each have first and second receiver windings 606A, 606B, 608A, and 608B respectively. Coupling loop portions 610 are spaced along the measuring axis at one-half of a wavelength $\lambda_1$ while the third coupling loop portions 614 are spaced along the measuring axis at one-half of a wavelength $\lambda_2$.

The exemplary embodiment of the reduced-offset absolute position transducer 600 has the ability to simultaneously sense the first receiver winding group 606, which has a position-dependent output signal that varies at the wavelength $\lambda_1$, and the second receiver winding group 608, which has a position-dependent output signal that varies at the wavelength $\lambda_2$. A time varying drive signal is applied to the transmitter winding 602 and the first receiver winding group 606 and the second receiver winding group 608 may be simultaneously sensed to determine the position of the read head along this scale, as described in the 268 application.

Figure 11:
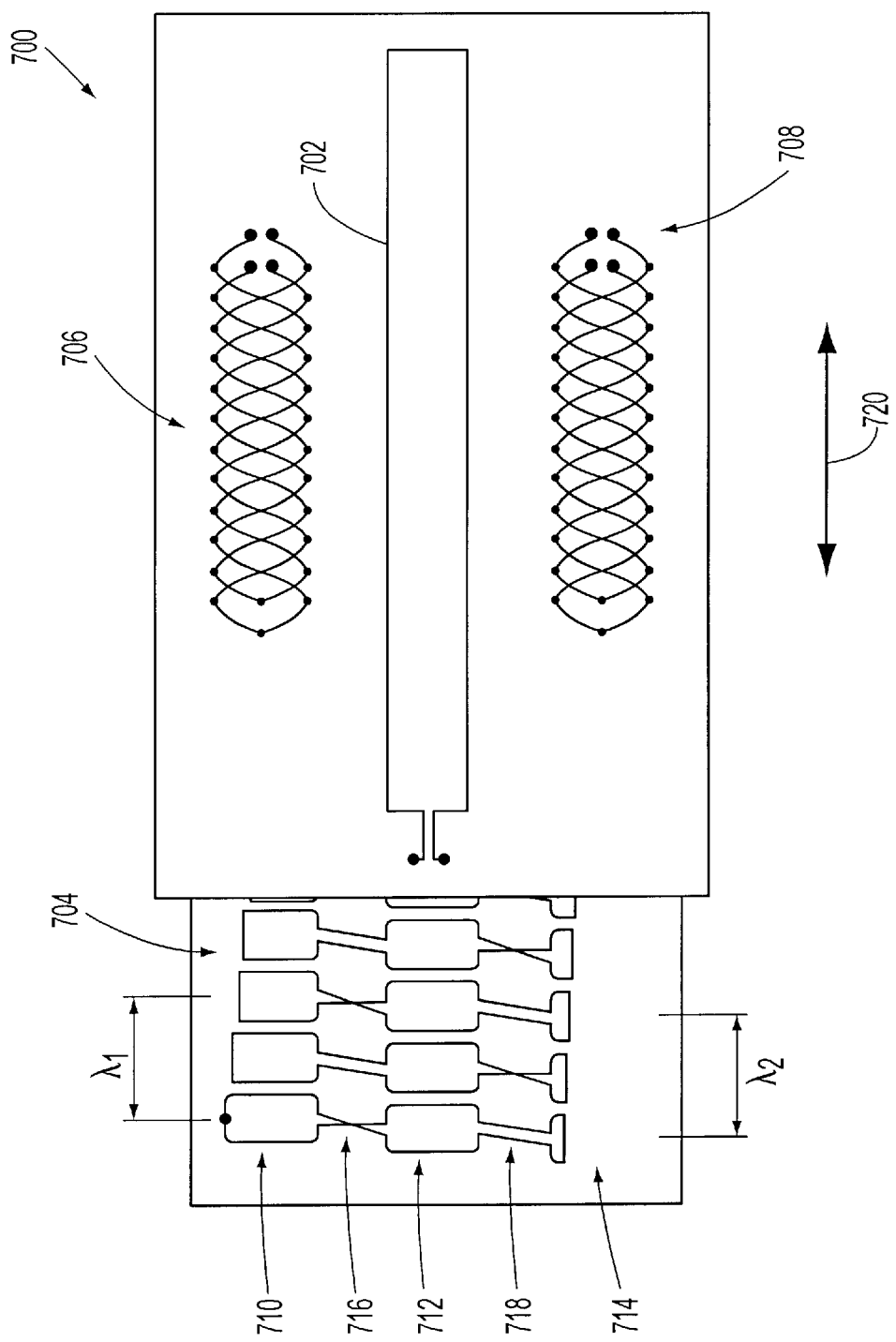
FIG. 11 shows the flux coupling loops of the scale member shown in FIG. 10 modified according to this invention.

The coupling loop portions 610 and 614 shown in FIG. 10 may be easily modified according to this invention, as shown in FIG. 11 to extend the range of the reduced-offset absolute position transducer 600. As shown in FIG. 11, this reduced-offset absolute position transducer 700 includes a plurality of coupling loops 704, a first receiver winding group 706 and a second receiver winding group 708. The plurality of coupling loops 704 each includes a first coupling loop portion 710, a second coupling loop portion 712 and a third coupling loop portion 714. The first coupling loop portions 710 are connected to the second coupling loop portions 712 by connecting conductors 716 and the second coupling loop portions 712 are connected to the third coupling loop portions 714 by connecting conductors 718. Every other one of the first connecting conductors 716 and the second connecting conductors 718 are twisted to spatially modulate the polarities of the first, second and third coupling loop portions 710, 712 and 714 along the measuring axis 720.

The second coupling loop portion 712 in each of the plurality of coupling loops 704 is the same size. However, as shown in FIG. 11, the first coupling loop portions 710 and the third coupling loop portions 714 are not the same width across the scale member 710. Specifically, the first coupling loop portions 710 and the third coupling loop portions 714 progressively vary in internal area in a direction across the length of the position transducer 700. As a result, the flux induced in the receiver windings positioned above the first coupling loop portion 710 and the third coupling loop portions 714 will vary. This varying inductive coupling causes the fundamental amplitude of the signals at the receiver windings to vary as the read head moves relative to the scale member along the measuring axis 720. This variance in amplitude may be used in conjunction with Eq. 12, as described above, to increase the absolute measuring range of the absolute position transducers disclosed in the incorporated 268 application.

It should be recognized that the relationship $(A-B)/(A+B)$ in accordance with the invention generates a linear relationship having a certain slope as illustrated by the line 310 of FIG. 7. The sensitivity of the absolute position transducer, as well as the absolute range, is dependent on the slope of the line 310. A flatter slope will generate a greater absolute range. However, a flatter slope will decrease the sensitivity or resolution of the position transducer. That is, a flatter slope will allow a greater magnitude of movement which is not detectable.

In further explanation of the sensitivity and absolute range of the position transducer of the invention, the signal amplitudes may be varied by what may be characterized as a factor "p." That is, $V_1$ and $V_2$ are the voltages at opposing ends of the scale as shown in FIG. 3, for example. The relationship between $V_1$ and $V_2$ may be expressed by $(V_2=p^*V_1)$, or alternatively $p=V_2/V_1$. The factor p may be characterized as a sensitivity factor.

In turn, using this relationship, the ratio $(A-B)/(A+B)$ in accordance with the invention may be expressed as:

$$(A-B)/(A+B)=[2x(p-1)]/[L(p+1)] \qquad (17)$$

It is useful to observe the absolute ends of the scale 104. At the absolute ends, $x=-L/2$ and $x=+L/2$. Plugging these values into Eq. 17 results in:

$$(A-B)/(A+B)=\pm(p-1)/(p+1) \qquad (18)$$

at the extreme ends of the scale. Further, at the center of the scale, $x=0$, and thus from Eq. 17, at the center of the scale, the ratio $(A-B)/(A+B)=0$.

Further, the relationship may be provided that $L=m^*\lambda_1$, where m is an integer and $\lambda_1$ is the wavelength of one of the transducers. Accordingly, when x changes by an amount $\beta\lambda_1$, the ratio $(A-B)/(A+B)$ will change by an amount:

$$2\frac{p-1}{p+1}*(\beta/m). \qquad (19)$$

If the sensitivity is assumed to be p=2, then it is necessary to resolve $(A-B)/(A+B)$ to roughly a factor of $\beta/m$ in order to measure a fractional displacement of $\beta/m$. Using the electronics presently available in position transducers, a factor of 1000 is very workable with the current circuitry.

The exemplary embodiments of the absolute position transducer of this invention have been described using linearly varying flux modulating elements to create the spatially dependent amplitudes. This was done solely to simplify the analysis of the output signals necessary to obtain the amplitude-dependent and phase-dependent position values. Thus, it should be appreciated that any predefined function for the spatial dependent amplitude can be used to modify the properties of the flux modulating elements, so long as it remains possible to analyze the resulting output signals to obtain the amplitude-dependent and phase-dependent position values to the required resolution. Such functions could be second or higher order functions, exponential functions, continues functions, discontinuous functions, or any other function that provides one position value for any amplitude value.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. An inductive absolute position transducer, comprising:
   a scale member;
   a read head member, the read member and the scale member movable relative to each other along a measuring axis;
   at least one transmitter winding formed on the read head member,
   at least one set of receiver windings formed on the read head member, each set comprising at least two receiver windings, and
   a signal generating and processing circuit electrically connectable to at least one transmitter winding and at least one set of receiver windings; and
   a plurality of flux modulating elements formed on the scale member and spatially distributed along the measuring axis, the flux modulating elements arranged into at least one track, wherein:
      for each track, the flux modulating elements of that track apply a first modulation to the inductive coupling between at least a first transmitter winding corresponding to that track and at least one set of receiver windings corresponding to that track based on the spatial distribution of the flux modulating elements of that track along the measuring axis and on a relative position between the read head member and the scale member along the measuring axis, and
      for at least one track, the flux modulating elements of that track have at least one varying flux modulating property that varies between the flux modulating elements and along the measuring axis to apply a second modulation to the inductive coupling between the at least first transmitter winding and the at least one set of receiver windings corresponding to that track based on the at least one flux modulating property.

2. The inductive absolute position transducer of claim 1, wherein the signal generation and processing circuit determines an absolute position of the readhead member relative to the scale member to a first resolution based at least partly on a signal component arising from the flux modulating elements having the at least one varying flux modulating property.

3. The inductive absolute position transducer of claim 2, wherein the signal generating and processing circuit determines the absolute position of the read head member relative to the scale member to a second resolution that is finer than the first resolution based at least partly on a signal component arising from the spatial distribution of the flux modulating elements along the measuring axis.

4. The inductive absolute position transducer of claim 1, wherein the spatial distribution of the flux modulating elements in at least one track is a periodic function.

5. The inductive absolute position transducer of claim 1, wherein the further modulation of the inductive coupling between the at least first transmitter winding and the at least one set of receiver windings by the flux modulating elements is a linear function along the measuring axis.

6. The inductive absolute position transducer of claim 1, wherein the at least one track of flux modulating elements comprises a single track of flux modulating elements.

7. The inductive absolute position transducer of claim 1, wherein the at least one track of flux modulating elements comprises two tracks of flux modulating elements.

8. The inductive absolute position transducer of claim 7, wherein the signal generating and processing circuit processes signals generated by each of the two tracks to determine an absolute position of the read head member relative to the scale member, the determined absolute position being relatively insensitive to overall signal amplitude variations.

9. The inductive absolute position transducer of claim 1, wherein at least one of the flux modulating elements is a flux enhancing element.

10. The inductive absolute position transducer of claim 9, wherein the flux modulating property is magnetic permeabilities of the flux enhancing elements.

11. The inductive absolute position transducer of claim 1, wherein at least one of the flux modulating elements is a flux disrupting element.

12. The inductive absolute position transducer of claim 11, wherein the flux modulating property is conductivities of the flux disrupting elements.

13. The inductive absolute position transducer of claim 11, wherein the flux modulating property is thicknesses of the flux disrupting elements.

14. The inductive absolute position transducer of claim 1, wherein at least one of the flux modulating elements is a flux coupling loop.

15. The inductive absolute position transducer of claim 1, wherein the flux modulating property is a varying area of the flux modulating elements.

16. The inductive absolute position transducer of claim 15, wherein the varying area is varying widths across the measuring axis of the flux modulating elements.

17. The inductive absolute position transducer of claim 16, wherein the varying widths of the flux modulating elements vary linearly along the measuring axis.

18. The inductive absolute position transducer of claim 15, wherein the varying area is varying lengths along the measuring axis of the flux modulating elements.

19. The inductive absolute position transducer of claim 18, wherein the varying lengths of the flux modulating elements vary linearly along the measuring axis.

20. A method for operating an inductive absolute position transducer system, the inductive absolute position transducer system comprising:
   a first member;
   a second member movable relative to the first member along a measuring axis;
   at least one first winding formed on a first one of the first and second members;
   at least one set of second windings formed on the first one of the first and second member, each set of second windings having a constant spatial wavelength; and
   a plurality of flux modulating elements formed on a second one of the first and second members and arranged along the measuring axis;
   the method comprising:
      generating a changing magnetic flux using one of the at least one first windings;

configuring the changing magnetic flux sensed by at least one set of second windings according to a first spatial modulation which is a spatially periodic function of the relative position of the second member relative to the first member along a measuring axis using at least some of the plurality of flux modulating elements;

configuring the changing magnetic flux sensed by at least one set of second windings according to a second predetermined spatial modulation which is a function of the relative position of the second member relative to the first member along the measuring axis using at least some of the plurality of flux modulating elements; and sensing the spatially modulated changing magnetic flux using the at least one set of second windings to generate at least one spatially periodic sensed signal having an amplitude range that depends on the relative position between the first and second members.

21. The method of claim 20, wherein spatially modulating the changing magnetic flux comprises varying the flux modulators.

22. The method of claim 21, wherein varying the flux modulators comprises varying the flux enhancing properties of at least one of the flux modulating elements.

23. The method of claim 22, wherein the varying the flux enhancing properties comprises modulating the magnetic permeability of the flux enhancing elements.

24. The method of claim 21, wherein varying the flux modulators comprises varying the flux disrupting properties of at least one of the flux modulating elements.

25. The method of claim 24, wherein the varying the flux disrupting properties comprises varying the conductivities of the flux disrupting elements.

26. The method of claim 24, wherein the varying the flux disrupting properties comprises varying the thicknesses of the flux disrupting elements.

27. The method of claim 21, wherein varying the flux modulators comprises varying a dimension of a flux coupling loop.

28. The method of claim 21, wherein varying the flux modulators comprises varying an area of the flux modulating elements.

29. The method of claim 28, wherein varying the area comprises varying widths of the flux modulating elements across the measuring axis.

30. The method of claim 29, wherein varying the widths comprises varying the widths of the flux modulating elements linearly along the measuring axis.

31. The method of claim 28, wherein varying the area comprises varying lengths of the flux modulating elements along the measuring axis.

32. The method of claim 31, wherein varying the lengths comprises varying the lengths of the flux modulating elements vary linearly along the measuring axis.

33. The method of claim 28, wherein varying the area comprises varying areas of one or more holes in each of the flux modulating elements.

34. The method of claim 33, wherein varying areas comprises varying the areas linearly along the measuring axis.

35. A method for operating an inductive absolute position transducer system, the inductive absolute position transducer system comprising:

a first member;

a second member movable relative to the first member along a measuring axis;

at least one first winding formed on a first one of the first and second members;

at least one set of second windings formed on the first one of the first and second member, each set of second windings having a constant spatial wavelength; and a plurality of flux modulating elements formed on a second one of the first and second members and arranged along the measuring axis;

the method comprising:

generating a changing magnetic flux using one of the at least one first windings;

positionally-dependently spatially modulating the changing magnetic flux sensed by the other of the at least one first winding and the at least one set of second windings using the plurality of flux modulating elements such that a degree of the spatial modulation is position dependent;

sensing the spatially modulated changing magnetic flux using the other of the at least one first winding and the at least one set of second windings to generate at least one spatially periodic sensed signal having an amplitude range that depends on the relative position between the first and second members.

* * * * *